No. 680,928. Patented Aug. 20, 1901.
M. LEVY.
GRATING OR SCREEN FOR PHOTOMECHANICAL PRINTING PROCESSES.
(Application filed Dec. 11, 1900.)
(No Model.)

Witnesses:
G. S. Elliott.
Geo. M. Copenhaver.

Max Levy,
Inventor,
By Eugene W. Johnson,
Attorney.

UNITED STATES PATENT OFFICE.

MAX LEVY, OF PHILADELPHIA, PENNSYLVANIA.

GRATING OR SCREEN FOR PHOTOMECHANICAL PRINTING PROCESSES.

SPECIFICATION forming part of Letters Patent No. 680,928, dated August 20, 1901.

Application filed December 11, 1900. Serial No. 39,547. (No model.)

*To all whom it may concern:*

Be it known that I, MAX LEVY, a citizen of the United States, residing at Philadelphia, in the county of Philadelphia and State of Pennsylvania, have invented new and useful Improvements in Gratings or Screens for Photomechanical Printing Processes, of which the following is a specification.

This invention relates to improvements in gratings or screens such as are used in the production of half-tone photomechanical engravings; and the invention consists more particularly in the means employed for securing together the prepared or ruled plates of glass.

In carrying out the invention I use two lined or ruled plates of glass, the smaller plate having beveled edges, which plates are held together by strips of glass secured to the projecting edges of the larger plate and to the beveled edges of the smaller plate by means of cement, whereby objections incident to the old ways of connecting the plates are obviated.

Figure 1:
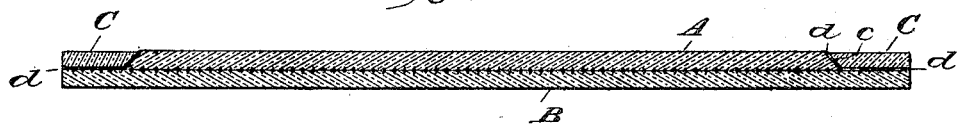
Figure 2:
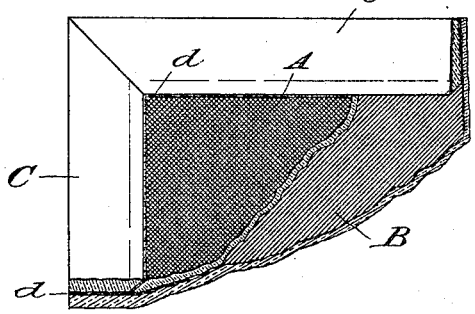
Figure 3:
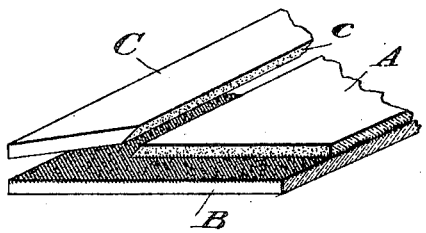

In the accompanying drawings, Figure 1 is a sectional view of a grating constructed in accord with my invention; Fig. 2, a plan view of a portion of a grating; and Fig. 3, a perspective view showing a portion of a grating, the retaining-strip being separated from the ruled plates.

In carrying out my invention one of the lined or ruled plates of glass A has a beveled edge and is smaller than the other lined or ruled plate B, to which it is secured by strips of glass C, which may be of less thickness than the plate A, the edge $c$ of the strip being beveled to conform to the beveled edges of the plate A. The beveled edges of the plate A and the strips C are preferably ground, and the portion of the plate B which extends beyond the plate A may also be ground or otherwise roughened. The lined plates A and B may be connected by Canada balsam, and the strips C are cemented to the beveled edges of the smaller plate and to the projecting portion of the larger plate by means of a cement $d$, which has as its base soluble glass (silicate of sodium) and powdered asbestos, to which may be added a coloring-matter when it is desired to provide the grating with a colored border. The amount and character of the cement preclude the possibility of acid or moisture getting between the ruled plates.

Heretofore it has been customary to seal two plates of the same size one upon the other with Canada balsam and grind the edges or to bind the ruled plates together with some form of adhesive tape. Where the edges of the two plates are simply ground and left in that condition there are many factors which tend to cause the two plates of glass to separate at the edges, which allows the silver solution that drains from the sensitized plate used in connection with the grating and adjacent to the same to find its way between the plates of glass. If the edges are bound with adhesive tape, the difficulty mentioned is to some extent obviated; but the use of tape is objectionable, as the overlying portions of the same are in the way when cleaning the surfaces of the screen and, being constantly subject to abrasion in polishing, the screen soon deteriorates.

The beveled edges of the plate A and the strip are etched or ground to provide roughened surfaces, to which the cement will adhere, and, if desirable, the inner face of the strip may be roughened as well as that portion of the plate B which projects beyond the smaller plate. Where the lines or rulings are cut or etched into the plates, a roughened surface will be present and it will not be necessary to abrade the border of the larger plate; but where the rulings do not extend below the surface of the glass the polished face next to the protective bordering-strip may be roughened by grinding or etching.

In practice the thickness of the glass bordering-strip may be slightly less than the thickness of the top plate, so that the cement $d$ will bring the surface of the strip substantially on a line with the surface of the top plate, though in practice the surface of the glass strips C may be slightly below the surface of the plate with beveled edges. The strips may be mitered at their ends, and the cement, especially when colored, shows through the glass strip and the projecting portion of the larger plate, giving to the completed grating an ornamental appearance.

I claim—

1. A grating or screen for use in the production of half-tone photomechanical engravings made up of lined plates of different sizes, the smaller plate having beveled edges, strips with beveled edges cemented to the larger plate and to the beveled edges of the smaller plate.

2. A grating or screen for use in the production of half-tone photomechanical engravings, consisting of lined plates of different dimensions the smaller plate being centered upon the larger plate and provided with beveled edges, strips with beveled or undercut edges which are cemented to the projecting portions of the larger plate and to the beveled edges of the smaller plate, substantially as shown.

3. A grating or screen for the purpose set forth, made up of lined glass plates of different dimensions, the smaller plate having beveled edges, connecting and bordering strips of less thickness than the smaller plate, said strips being cemented to the projecting portions of the larger plate and to the beveled edges of the smaller plate whereby the plates are hermetically sealed and retained one upon the other.

In testimony whereof I have hereunto set my hand in presence of two subscribing witnesses.

MAX LEVY.

Witnesses:
E. L. WOODWARD,
M. A. PAPE.